Figure 1:
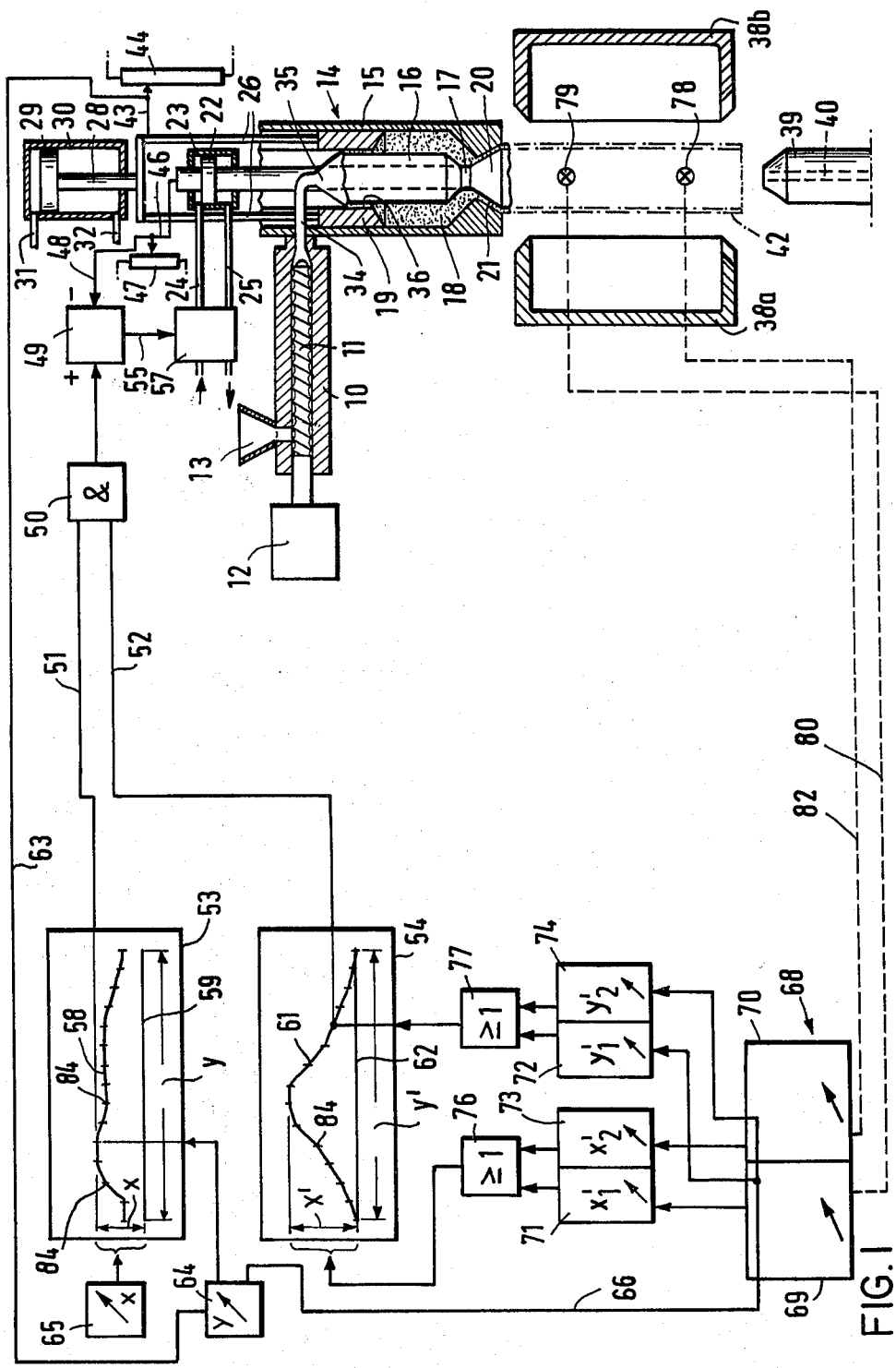

United States Patent [19]

Daubenbüchel et al.

[11] 4,424,178
[45] Jan. 3, 1984

[54] PROCEDURE AND DEVICE FOR PRODUCTION OF A PREFORM OF THERMOPLASTIC SYNTHETIC MATERIAL BY MEANS OF EXTRUSION

[75] Inventors: Werner Daubenbüchel, Bergisch-Gladbach; Dieter Hess, Swistal-Morenhoven; Erich Kiefer, Bonn, all of Fed. Rep. of Germany

[73] Assignee: Krupp Kautex Machinenbau GmbH, Bonn, Fed. Rep. of Germany

[21] Appl. No.: 341,373

[22] Filed: Jan. 21, 1982

[30] Foreign Application Priority Data

Jan. 23, 1981 [DE] Fed. Rep. of Germany ....... 3102076

[51] Int. Cl.³ ........................................... B29D 23/04
[52] U.S. Cl. .................................. 264/40.1; 264/40.5; 264/40.7; 264/541; 264/167; 425/141; 425/150; 425/159; 425/162; 425/532; 425/381; 425/465
[58] Field of Search ...................... 264/167, 541, 40.5, 264/40.7, 40.1, 209.2; 425/141, 150, 159, 166–167, 171–172, 162, 381, 532, 465–467

[56] References Cited

U.S. PATENT DOCUMENTS

| | | | |
|---|---|---|---|
| 3,307,215 | 3/1967 | Gerhard et al. | 425/162 |
| 3,368,241 | 2/1968 | Williams | 425/162 |
| 3,510,374 | 5/1970 | Walker | 425/162 |
| 3,561,052 | 2/1971 | Marolf et al. | 425/172 |
| 3,564,653 | 2/1971 | Sparks et al. | 425/532 |
| 3,587,281 | 6/1971 | Lemelson | 264/209.2 |
| 3,611,483 | 10/1971 | Amsden et al. | 425/532 |
| 3,611,494 | 10/1971 | Feuerherm | 425/461 |
| 3,649,148 | 3/1972 | Waltman et al. | 264/541 |
| 3,697,632 | 10/1972 | Tenner | 264/541 |
| 3,708,253 | 1/1973 | Lemelson | 425/532 |
| 3,749,535 | 7/1973 | Gaffney et al. | 425/150 |
| 3,759,648 | 9/1973 | Hunkar | 264/40.7 |
| 3,795,719 | 3/1974 | Morecroft et al. | 264/541 |
| 3,865,528 | 2/1975 | Roess | 425/166 |
| 3,883,280 | 5/1975 | Waltman et al. | 264/40.5 |
| 3,936,713 | 2/1976 | Hunkar | 264/40.5 |
| 4,159,293 | 6/1979 | Fukase et al. | 264/40.5 |
| 4,179,251 | 12/1979 | Hess et al. | 425/532 |
| 4,217,635 | 8/1980 | Handte et al. | 425/141 |
| 4,224,560 | 9/1980 | Uekusa | 264/40.5 |
| 4,338,071 | 7/1982 | Daubenbuchel et al. | 425/532 |

FOREIGN PATENT DOCUMENTS

| | | | |
|---|---|---|---|
| 2544609 | 4/1977 | Fed. Rep. of Germany | 264/541 |
| 3107701 | 1/1982 | Fed. Rep. of Germany | 264/40.1 |

Primary Examiner—Jeffery R. Thurlow
Attorney, Agent, or Firm—Panitch, Schwarze, Jacobs & Nadel

[57] ABSTRACT

During the production of a preform of thermoplastic synthetic material by means of extrusion from an extruder head provided with a slot-shaped exit opening, the width of which is changed according to a specific program during the extrusion of the preform in order to change the wall thickness thereof, the wall thickness of at least one section of the preform should be controlled by at least one additional program, which is superposed on at least one portion of the first program, which is longer than the additional program. In this manner, one achieves greater flexibility in respect to fulfilling the requirements of each situation on the programming, namely both in respect to the resolution and in respect to precise determination of the location of the individual switch points, even when a very great number of changes of the slot width must be undertaken over a very short section of the preform or during a very short time period during the extrusion process.

25 Claims, 6 Drawing Figures

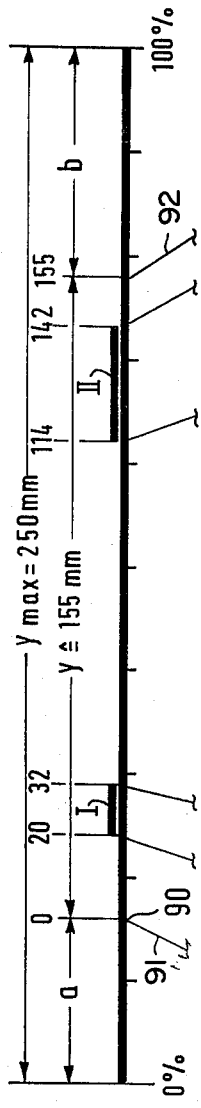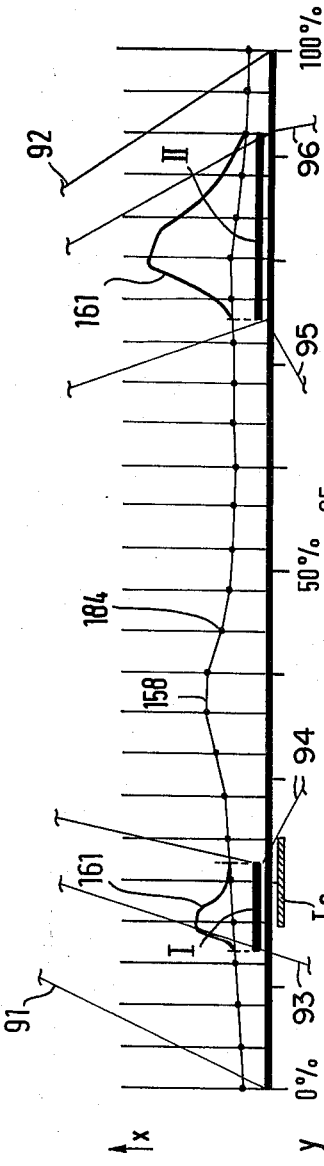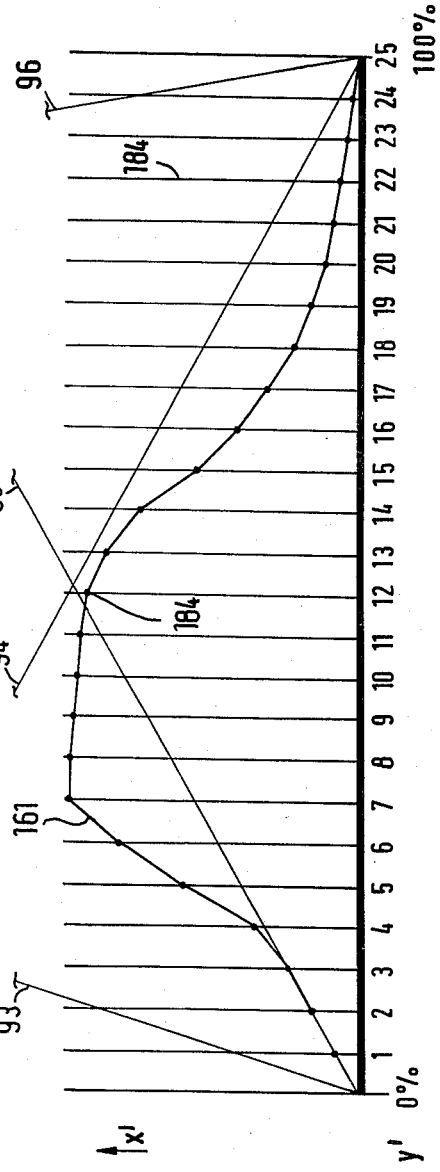

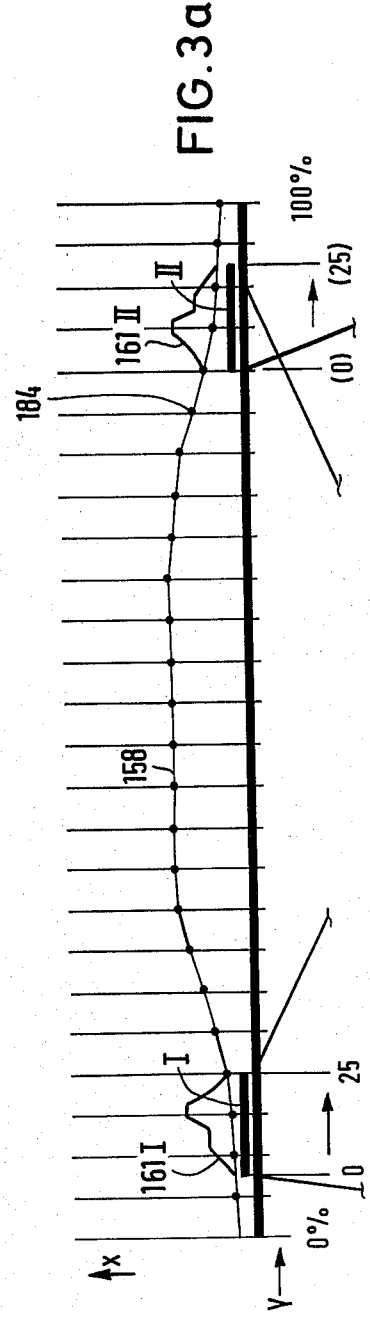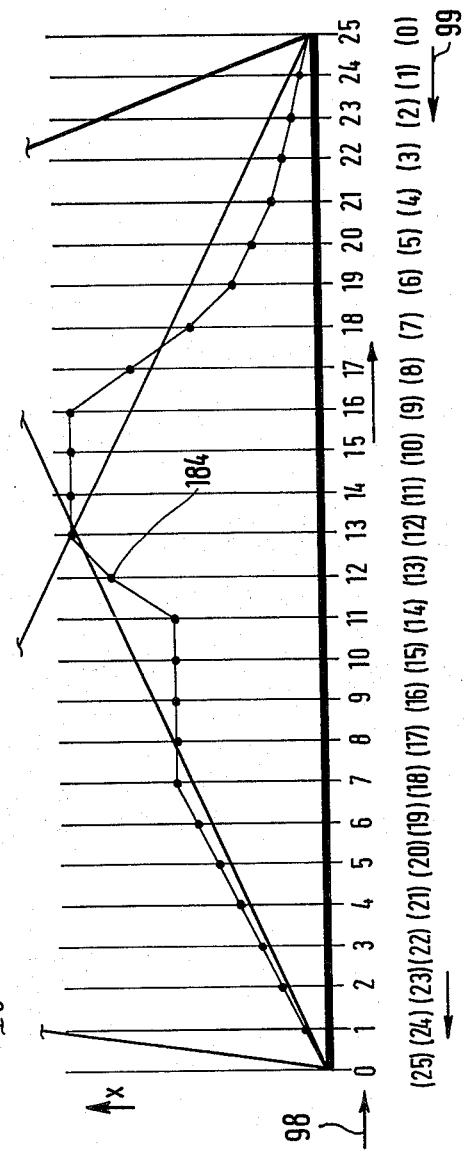

PROCEDURE AND DEVICE FOR PRODUCTION OF A PREFORM OF THERMOPLASTIC SYNTHETIC MATERIAL BY MEANS OF EXTRUSION

The invention concerns a procedure for manufacturing of a preform of thermoplastic synthetic material by means of extrusion from an extruder head, which is provided with a slot-shaped exit opening, the width of which can be changed according to a program during the extrusion of the preform in order to adjust the wall thickness of the same, and a device suitable for the execution of this procedure.

In the case of manufacturing tubular preforms, the exit opening of the extruder head is shaped as an annular passage. Since, in the practice, this is the most common application, the manufacturing of a tubular preform and a correspondingly annular exit opening will be assumed throughout the following text. However, the invention is also applicable for preforms with other shapes, e.g. in conjunction with the extrusion of band-or foil-shaped preforms, whereby varying cross-sectional shapes are also possible.

The influence on the wall thickness of the preform in accordance with a predetermined program takes into consideration the requirements for further processing in a blow mold and/or the finished product resulting thereof. Generally, the arrangement is such that switch points are provided at certain distances from one another in a programmed device, namely over a distance corresponding to the length of the preform, which switch points cause a change of the slot width of the exit opening during the extrusion process, when a specific length of the preform has been reached. However, programmed devices where the switch points are located at constant distances from one another, have the disadvantage that the position of the switch points rarely corresponds to those points on the preform where changes are to be effected in the progression of the wall thickness. By increasing the number of the switch points, the precision becomes greater for executing the changes. However, the costs for the programmed device also increase with the increasing number of switch points. Particularly for long preforms, it is necessary to use a programmed device with a very great number of switch points if a somewhat complicated wall thickness program is to be applied to short partial areas of the preform. Thus, if the preform is 4 m long and a programmed device with 25 switch points at constant distances from one another is used, the individual switch points will be at a distance of approximately 160 mm from one another if the programmed device is controlled by dependence on the increasing length of the preform during the extrusion process. If the control is executed by dependence on time or volume, the distances may even be considerably greater, since a decrease in the wall thickness and, consequently, a decrease in the slot width in case of constant volume passage per unit of time will lead to an increase in the exit speed. In any case, it is not possible to execute a more complicated wall thickness program on a partial section of 160 mm, if this partial section is located between two switch points. Nor can a more complicated wall thickness program be applied over a longer partial section of e.g. 400 mm, since over such a distance, there is a maximum of three or four available switch points, which are not sufficient for a more complicated program. If a programmed device with two hundred switch points were used, the conditions would naturally be significantly more advantageous, since in that case, the distances on the preform corresponding to two adjacent switch points would only be 20 mm. However, such a programmer would be very costly and would still not guarantee that all requirements concerning the wall thickness could be optimally fulfilled.

Some of the problems described in the preceding could be avoided if the switch points could be arranged not at constant distances but rather in an adjustable manner over a distance corresponding to that length of the preform where the wall thickness is to be influenced, so that there would be a possibility to concentrate the switch points in those areas where numerous changes of the slot width were to be effected at short time intervals, or, over a short section of the preform. Such programmed devices are also known. However, they have the disadvantage that the settings of such a programmed device are extremely difficult and in many cases even impossible without additional devices which visualize the set program in relation to the progression of the preform, e.g. by means of a monitor. In any case, the use of a programmed device of this nature requires the availability of particularly well qualified experts. In many cases, this condition cannot be fulfilled. In addition, difficulties may occur because adjustable instrumentation, e.g. potentiometers, related to the individual switch points, may not have the mutual precision and uniformity which is required in order to obtain a usable result when the switch points are at short distances from one another.

The purpose of the invention is to modify procedure and device of the nature initially described in such a way that the disadvantages described in the preceding can be avoided. Particularly, the purpose is to achieve greater flexibility and consequently adjustability to the momentary requirements on the programming, namely both in respect to the resolution and in respect to precise determination of the position of the individual switch points, even when a great number of changes of the slot width must be executed on a very short section of the preform or during a very short period of the extrusion process. Herein, "resolution" is understood to mean that even when there is a very short distance between those points on the preform where a change of the slot width progression is undertaken, the distances are nevertheless still sufficiently great in that field of the programmed device where the individual switch points are set, so that a good overview is possible. The device used for this purpose should be simple and easy to survey in respect to both structure and operation so that, if the occasion arises, commercially available combinations of programmable equipment can be used.

In order to solve this problem, the invention suggests that the wall thickness of at least a section of the preform is controlled by means of at least one additional program, which is superposed over at least a section of the first program, which is longer than the additional program. This procedure has the advantage that a high program resolution can be obtained in one—or several—relatively short section(s) of the preform, whereby simple devices are normally sufficient, while the programming of the wall thickness over the remaining area of the preform is executed in the usual manner and with utilization of the usual equipment. Thereby, it is definitely possible that the programming device for the additional program corresponds to the first program in respect to structure as well as the number of switch points.

If it is assumed, for instance, that one hundred units are required for the manufacturing of a preform, which units are given as signal sequences, e.g. as impulses on the first programmed device in order to call up the program, and that the programmed device contains twenty-five switch points, a new adjustment of the wall thickness progression is obtained after each four units —100:25. With a programmed device of this type, minor steps cannot be executed, i.e. changes of the wall thickness progression within shorter distances, so that a more complicated program is not possible to execute over a section of the preform that corresponds to ten units of impulses. Furthermore, as has already been mentioned, there is a possibility that the position of the switch points of the first programmed device does not correspond to the position of those points or planes on the preform where the changes of the wall thickness progression are to be made. Since, in a programmed device with twenty-five switch points, the subdivisions, i.e. the location of the switch points, are located at 0, 4, 8, 12, etc., a change in the wall thickness which is planned to take place at 10, must take place either at 8 or at 12.

On the other hand, the second programmed device, which may, for instance, also contain twenty-five switch points, will be effective only over a section of the total length. If it is assumed that the length of the section to be affected corresponds to ten units or impulses, there will be a distance between the switch points of 10:25=0.4 units. This means that a very complicated program can be applied to a very short section of the preform with very great resolution, i.e. with corresponding precision, whereby it is furthermore possible to determine the beginning and the end of the change of the wall thickness progression controlled by the second program, practically at will. In the previously mentioned example, the beginning of the activation of the second programmed device could be set at the initiation of impulse 10 and consequently end at impulse 20, whereby impulse 10 does not correspond to a switch point of the first programmed device.

It is also possible to apply the additional, shorter program two or more times during the extrusion of the same preform. As an example, mention can be made of the application of the second programmed device for the front and rear end areas of the preform.

Normally, the values x and x' of the first and of the second program are added, so that the slot width corresponds to the sum of these two values. Otherwise, it can also be arranged that the first program causes no change in the slot width to the activity area of the second program, namely so that its setting is such that it corresponds to a constant slot width. Normally, the length of the first program will correspond to the length of the preform.

In the abovementioned multiple application of the second program to the same preform, the procedure can be such that the length of the sector influenced in each case by the second programmed device will differ, for instance so that the length of the program is distributed over ten units or impulses in the first application and over fifteen in the second application. Corresponding possibilities also apply to the dimension of the slot width.

Naturally, there is also a possibility to apply several additional programmed devices for several wall thickness programs to be applied to the same preform, and that these devices are programmed differently.

It is possible to control the second programmed device(s) by dependence on the same characteristic quantities as the first one—e.g. time, volume of the extruded material, length of the preform during the extrusion process. However, it may also be advantageous to control the first programmed device and the second programmed device in relation to different characteristic quantities, e.g. in such a manner that the first program device is controlled in relation to volume and the second one in relation to the increasing preform lengths during the extrusion process. This may be advantageous when it is desirable to keep the influence of speed changes as low as possible, which changes are caused by changes in the slot width of the exit opening.

An execution example of the invention is represented in the drawing. The following is shown:

FIG. 1

Schematically, a device for production of hollow bodies of thermoplastic material in a blow procedure, including the related program devices for control of the wall thickness of the preforms;

FIGS. 2a-c

FIGS. 3a and 3b

Diagrams illustrating the influence on the wall thickness of the preform over its length by means of the first program device and the second program device.

The device shown schematically in FIG. 1 has an extruder 10, the screw 11 of which is driven by a motor 12. The thermoplastic material is fed to the extruder 10 via a funnel 13. An extruder head 14 is arranged after the extruder 10, which head consists basically of a housing 15, a stationary mandrel 16, a core 17 arranged within the latter so that it can be moved axially, a storage space 18, and an annular piston 19, which can also be axially moved back and forth. At its lower end, the core 17 has a conically developed enlargement 20, which represents the inner limits of an exit opening 21, shaped as an annular slot. The outer limit of the exit opening 21 is formed by the lower part of the housing 15, which is provided with an opening, within which the enlargement 20 is positioned when it leaves the exit opening 21. As can be seen from the drawing, an axial movement of the core 17 and thereby also of its enlarged area 20, will result in an increase or decrease of the annular slot 21. In the area of its upper end, the core 17 is provided with a piston 22, which is guided inside a cylinder 23. The intake and outlet lines for the normally hydraulic pressure agent are indicated with 24 and 25. By means of bolts 26, distributed over its circumference, or by other means, the piston 19 is connected with the piston rod 28 of a piston 29, which is arranged in a cylinder 30 in such a manner that it can slide. Intake and outlet lines 31 and 32 are provided for the pressure agent, which is normally hydraulic.

The housing 15 of the extruder head 14 is provided with an intake opening 34 for the thermoplastic material, which is transported via two channels 35 located opposite each other and widening downwards, into a form which is circular in cross section, and then flows via the intermediate channel 36 into the storage space 18, whereby it moves the piston 19 upwards. So far, the design of the extruder head can coincide with the objects of German Offenlegungsschrift No. 1,704,791 and U.S. Pat. No. 3,611,494, although this is not required for the application of the invention.

Below the extruder head 14, there is a blow mold, consisting of two mold halves 38a, 38b, connected with a blow nozzle 39. The latter serves to feed a pressure agent via a boring 40 into the blow mold 38a, b, and into a preform located therein.

The device functions in the following manner: in the extruder 10, which normally runs continuously, plastic material is first brought through the channels 35 and the intermediate channel 36 into the ring-shaped storage space 18, whereby, as the filling of the storage space 18 continues, the piston 19 is pushed upwards, until it reaches an upper end position—which is adjustable—shown in the drawing. As soon as the piston 19 has reached its upper end position, the piston 29 is moved by known means admitted through the line 31, with the result that the piston 19 is moved downwards into its adjustable bottom end position. Thereby, the thermoplastic material in the storage space 18 is extruded through the exit opening 21 in the form of a tubular preform 42 into the area between the two mold halves 38a, 38b. The blow mold 38a, b is at least partially open at this time. Thereafter—by means of a control impulse produced when the piston 19 arrives at its bottom dead center—the blow mold 38a, b is closed around the preform 42, after or before the blower mandrel 39 has been or will be inserted into the lower end of the preform 42. Then, the preform 42 is expanded. Naturally, it is also possible to develop the feed of the pressure agent in another manner and/or at a different location, e.g. above the blow mold 38a, b. All these possibilities and executions are known and need not be described in greater detail.

After the expansion process, the resulting hollow body still remains inside the blow mold 38a, b for a specific period of time as required for sufficient cooling and solidification of the thermoplastic material. The finished hollow body, on which there may still be some scrap parts, is removed from the blow mold 38a, b so that the latter will be ready to accommodate the next preform 42. This situation is represented in the drawing in FIG. 1, whereby, however, the two mold halves 38a, 38b have already completed part of the closing travel. The piston 19 is provided with a position indicator 43, which works in conjunction with a position transmitter 44. The latter is developed as a potentiometer. An additional position indicator 46 is provided with the core 17 and, consequently, with the conical enlargement of the core 17, which limits the exit opening 21 on the inside. This position indicator works in conjunction with a position transmitter 47, developed, e.g. as a potentiometer, which is connected via a line 48 with a comparison and adjustment device 49. The latter is connected via lines 51 and 52 with the programmers 53 and 54 with insertion of an addition member 50.

The comparison and adjustment device 49 receives the actual value of the width of the slot 21 from the position indicator 47 via the line 48. The desired value is delivered from the addition member 50. Via a line 55, there is a connection with a relay valve 57, which is joined up in circuit with the lines 24 and 25, which are connected with the cylinder 23.

A specific program concerning the distribution of the wall thickness of the preform 42 in longitudinal direction of the same has been fed into both programmers 53 and 54. To clarify the situation, two lines 58 and 59, and 61 and 62, respectively, are always included in both programmers, which lines correspond to widths of the exit slot 21 at a specific time during the extrusion of the preform 42. Thereby, the lines 58 and 61 always indicate the progression of the slot width between two subsequent switch points 84. Thus, the distance x of the line 58 from the base line 59 and/or the distance x' of the line 61 from the base line 62 always corresponds to the width or part of the width of the exit slot 21, whereby the momentary values x and x' of both program devices are added within that area where both programmers 53 and 54 are simultaneously activated. Further, the value y of the programmer 53 corresponds to the length of the preform 42, so that the curve 58 corresponds to the distribution of wall thickness of the preform over its entire length. On the other hand, the value y' of the programmer 54 corresponds only to a section of the preform.

The expulsion stroke of the piston 19 for forming the preform 42 is adjustable. For instance, if the quantity of material required for the production of a preform 42 is less than the maximum storage volume of the storage space 18, the piston 19 will move back and forth between two end positions at a shorter distance from each other than the two extreme end positions, which correspond to the maximum storage capacity in the storage space 18. The travel of the position indicator 43 in the expulsion stroke depends on the length of the stroke. It is related to the length y in the programmer 53. The length y' of the programmer 54 can be related to at least one section of the preform 42, the length of which may, however, be independent of the total length of the preform. Normally, the second programmer 54 is used for the application of an additional wall thickness program to one or several specific longitudinal sections of the preform 42, which may be very short. This means in the practice, that if the programmer 54 is provided with e.g. twenty-five switch points at identical distances from one another over the distance y', these twenty-five points are distributed over a very short distance in that section to which they have been assigned; this distance may be very much shorter than the dimension corresponding to length y' on the indicator and manipulation field of the programmer 54, where each wall thickness program is composed by setting the value x' for the individual points 84. This means that the possibility of handling the programmer in respect to the setting of the individual switch points is retained in every case, independently of how close to each other the individual switch points are located on that section of the preform which is influenced by this second program.

The fact that the length y' of the second programmer normally corresponds only to a very short section of the preform offers the possibility to use the second programmer 54 more than once during the extrusion of the same preform 42; thus, for instance at both end sections of the preform. Thereby, the predetermined program concerning the relative position x' of the individual program points to each other and their distribution over the length y' will remain unchanged. However, there is a possibility to assign the length y' to sections of different length of the preform 42. This means that when the programmer 54 is used for the second time on the same preform, the length of the preform section influenced by the distance y' may be shorter or longer than in the first application of the programmer 54. The same also holds true for the value x' of the points 84. Although the relative changes of the slot width between the individual switch points 84 will remain unchanged, the total dimension may be different in the second application. In the practice, this means that x' and y' can be spread out or compressed according to the momentary requirements, whereby this means, in the case of y', that the number of units or impulses corresponding to the distance between two adjacent switch points 84 will be lesser or greater.

In the execution example represented in FIG. 1 in the drawing, the program inserted in the programmer 53 is run by dependence on the expulsion stroke of the piston 19. This relationship is established via the line 63, which is connected on one side with the position transmitter 44 and on the other side, with insertion of an adapter member 64, with the programmer 53. The adapter member 64 serves to adjust the distance y of the programmer 53 to the actual stroke length of the piston 19, so that the length y of the program field corresponds to that distance over which the position indicator 43 is moved along the position transmitter 44.

These interrelationships will be explained in the following with reference to the FIGS. 2a through 2c.

The assumption is that due to the combined effect of the position indicator 43 and the position transmitter 44, a great number of impulses are generated at equal intervals through the line 63 to the programmer 53 during the course of the piston stroke, whereby material for producing a preform 42 is pressed out from the storage area 18 by means of the piston 19, whereby the number of impulses should be 250 for a maximum piston stroke of e.g. 250 mm. Thus, in this example, 1 impulse per 1 mm piston stroke is generated to the programmer 53, so that in case of a maximum piston stroke, impulse 1 is assigned to the beginning and impulse 250 to the end of the piston stroke. This also means that impulse 1 defines the beginning and impulse 250 the end of the distance y of the programmer 53, provided that the program length y corresponds to the maximum piston stroke. The maximum piston stroke is designated as y max in FIG. 2a, whereby the length of the piston stroke in mm is given at the top of the representation and the length of the program in percent of the maximum piston stroke is given at the bottom.

In the example represented in FIGS. 2a–c, it is further assumed that for the production of a specific preform 42, the piston 19 travels only part of the maximum possible distance of 250 mm, namely between end positions corresponding to the impulses 40 and 195 of y max or the points 40 mm and 195 mm of the piston stroke. This means that in the production of this particular preform, point 40 in the representation according to FIG. 2a defines the upper turning point and point 195 defines the lower turning point of the piston 19. The distances a (0–40) and b (195–250) will thus not be covered by the piston 19. The result is that during the expulsion stroke, only a total of $250-(a+b)=155$ impulses will be transmitted through the line 63 to the programmer 53.

This means that the distance y of the programmer 53 for the production of this preform must correspond to that distance of travel which in turn corresponds to 155 impulses or 155 mm piston stroke. Or, in other words, that the travel distance of 155 mm corresponding to 155 impulses fills the distance y in the program field of the programmer 53. This adjustment of the distance y of the programmer 53 to the actual length of the stroke travel of the piston 19, and thus of the distance covered by the position indicator 43, is achieved by means of the adapter member 64.

Correspondingly, the value x, which determines the slot width of the exit opening 21 can also be varied by means of the adapter member 65 as needed, while the arrangement of the switch points 84 otherwise remains the same, e.g. so that an increase of the x value results in a spreading out of the program in the x direction.

After being adjusted in the adapter member 64 to the required program length y, the signals coming via line 63 from the position transmitter 44 are forwarded via a line 66 into a starter device for the programmer 54. As an example, it is assumed that its program is used twice during the extrusion of a preform 42. Thus, the starter device 68 is provided with two starter elements, 69 for the first application and 70 for the second application. In each case, an adapter member 71 and 72, and 73 and 74, respectively, is assigned to the two starter elements 69 and 70 for the x' and y' values of the switch points 84 of the programmer 54. The function of these members corresponds to that of the members 64 and 65 of the programmer 53. Further, between the x' entry on one hand and the y' entry on the other hand into the programmer 54, there is an "or-member" 76, or 77, the function of which is to allow passage only of the signals related to the particular application.

In the execution example described here, the first application of the programmer 54, in the following designated as Additional Program I, is to last for a duration of twelve impulses, starting at impulse 20 of the program of the programmer 53, in the following referred to as the Base Program, and ending at impulse 32 of the Base Program. The second application of the programmer 54, which will be designated Additional Program II, is to last for a duration of twenty-eight impulses, starting at impulse 114 of the Base Program and thus ending at an impulse 142 of the Base Program. This means that the program duration of Additional Program II is more than twice as long as that of Additional Program I and, consequently, that y' of Additional Program II is more than twice as long as in Additional Program I.

In order to avoid misunderstandings, it should be emphasized that the count of the impulses indicated in the preceding starts at the beginning of the program, namely at 90 (FIG. 2a) with a duration of 155 impulses or mm according to the length y. This means that the distance of the maximum possible piston stroke is not considered in the count, since it will not be travelled in the program given here as an example.

To clarify the conditions, FIG. 2b shows the distance $y=155$ mm or impulses, which is less than 100% of the maximum possible piston stroke, as being $y=100\%$, i.e. 100% of the program field. Further, FIG. 2b shows the switch points 184 of the programmer, whereby, however—deviating from the representation in FIG. 1—a programmer with twenty-five switch points 184 has been assumed. Beginning and end of the program length y in the FIGS. 2a and 2b have been related to each other by means of the lines 91 and 92 connecting FIGS. 2a and 2b. From the representation in these two figures, it can be seen that each program length y, which is shorter than y max, has been spread out over the predetermined length y of the programmer 53 by means of the adaptation member 64, so that the distance between those points on the preform which correspond to the switch points 84 or 184 of the programmer decreases with decreasing length of the preform. At least theoretically, this means greater precision for adjusting the wall thickness program with a given number of switch points, the intervals between which cannot be varied in the programmer.

This effect, i.e. the greater precision of the adjustability of the wall thickness program, e.g. according to curve 158 in FIG. 2b, is utilized according to the invention, since the assumption is that the additional program of the programmer 54 is applied to sections of the preform which are significantly shorter than the total length of the preform. This becomes obvious, particularly in a comparison between the FIGS. 2b and 2c. The latter shows the progression 161 of the Additional Programs I and II. Since the distance between the switch points 84 and 184 in the programmer 54 is the same as the distance between the switch points in the programmer 53, there is a very strong resolution of the progression 161 of the Additional Programs I and II, as can be seen, particularly from the lines 93, 94, and 95, 96 which connect the beginnings and ends of Additional Programs I and II with beginnings and ends of y'. The Additional Program I corresponds to the duration of twelve impulses or a stroke length of 12 mm, which equals 100% of the length y'.

In the Additional Program II, the resolution is slightly less, since in this case, the total length, i.e. 100% of y', consists of a duration of twenty-eight impulses or a stroke length or 28 mm. Nevertheless, the resolution is extraordinarily great in this case as well, since with 25 switching points, there is still almost one switch point for every 1 mm stroke length of the preform section to be affected by Additional Program II. In Additional Program I, there are even more than two switch points 184 on each 1 mm stroke length.

In the production of the preform 42, only the program of the programmer 53 is run at first, at the beginning of the expulsion stroke of the piston 19, as shown by means of curve 58 or 158. This is the case until the 20th impulse via lines 63 and 66 releases the start of Additional Program I via the starter element 69. Thereafter, the program according to curve 161 is run over the length y' corresponding to 12 impulses in addition to the program of the programmer 53 according to curve 158 (FIG. 2b). The characteristic quantities x and x' from the two programmers 53 and 54 are added in the addition member 50 and fed into the adjustment device 49, which compares the actual location of the core 17 or its continuation 20, as received via the position indicator 46 and position transmitter 47, with the desired location which is obtained from the position of the piston 19 and the sum signal of the programmers 53 and 54. In case of deviations of the actual position from the desired position, corresponding signals are fed to the relay valve 57, causing a change of the position of the movement of the core 17 and, consequently, of the width of the slot forming the exit opening 21.

At the beginning of the extrusion process, i.e. until impulse 20 has been reached, this adjustment is executed solely by means of the programmer 53.

In the area of the Additional Program I, FIG. 2b shows progression 161 thereof, which is superposed on the progression of the Base Program 158. In the outcome, the slot width of the exit opening 21 determined by the additional program is added to that of the Base Program. In addition, FIG. 2b shows that the twenty-five switch points of the additional program extend over a distance range y' which is only approximately twice as long as that section of y of the Base Program which corresponds to the distance between two subsequent switch points 184 of the programmer 53.

When the piston 19 has reached a position of its expulsion stroke that corresponds to impulse 32, and end of Additional Program I has been reached, so that the width of the slot 21 will again be controlled exclusively by the programmer 53 in the manner already described, until the impulse 114 or the 114 mm point of the utilized piston stroke has been reached. With impulse 114, Additional Program II is activated via the starter element 70 of the additional programmer 54, and this program is run over the next twenty-eight impulses, until impulse 142 has been reached. The fact that Additional Program II has a greater length y' than Additional Program I has already been mentioned.

The x values of the individual switch points 184 are increased when the Additional Program II is run. However, due to the previously mentioned increase of y', the ascents and descents between two subsequent switch points 184 in Additional Program II are approximately the same as in Additional Program I, and consequently also the rates of speed of the changes of the slot. From impulse 142 to the end of the programmed expulsion process at impulse 155, the slot width 51 and thus also the wall thickness of the preform will again be controlled exclusively through the Base Program of the programmer 53.

In the execution examples according to FIGS. 3a and 3b which correspond to FIGS. 2b and 2c, the assumption is again made that there are two superpositions of additional program and base program, but with the difference that the aboslute values of y' and x' are identical in the two additional programs while, however, Additional Program II is developed as the reverse image of Additional Program I. In the execution, this means that Program II is run in the reverse direction along the line y'. Such a procedure can be advantageous in a great number of cases, where a specific condition exists for a specific wall thickness distribution to occur twice in a hollow body to be manufactured from the preform, whereby, however, the two areas with this specific wall thickness distribution are arranged as reverse images of one another. A typical example might be a barrel-like hollow body which, at each end, has a transitory piece between the mantle and one bottom. In many cases, the wall thickness conditions in both transitory sections are mirror images of each other. Correspondingly, this must also be the case in respect to the wall thickness distribution of the preform, from which this barrel will be produced in a blow mold.

In a concrete application case, this means that when the first additional program is run, i.e. when Additional Program I is used, the length of the distance y' corresponding to the additional program will be run from left to right according to the representation in FIG. 3b, i.e., in the direction of the arrow 98, until the twenty-fifth switch point 184 is reached at the end thereof. After completion of Additional Program I, the wall thickness distribution is then run exclusively according to the Base Program in accordance with curve 158 in FIG. 3a, until that impulse or that position of the piston 19 during the expulsion stroke has been reached, where Additional Program II begins. FIG. 3a shows that its progression according to curve $161_{II}$ corresponds to the progression of curve $161_I$ of Additional Program I, although reversed. This means, that when Additional Program II is activated, the distance y' of the additional program is run in the opposite direction as indicated by means of the arrow 99.

In the preceding explanation of the execution examples, it is assumed that both the start of the programmer 53 for the Base Program and that of the programmer 54 for the additional program will be effected in relation to the expulsion stroke of the piston 19. The transmission of the programs from the programmers will also be effected in relation to the expulsion stroke of the piston 19, via the impulse sequence generated by the position indicator 43. However, there is also the possibility to effect the start and the run of the programs in relation to time. This applies particularly to the additional programs. Another possibility is to arrange two light barriers in the movement area of the preform 42, which have been indicated in the drawing by means of two photocells 79 and 78. As soon as the free end of the preform 42 has reached the photocell 79 in the course of the extrusion process, this photocell gives an impulse to the starter element 69 via a line 80, in order to activate the programmer 54 for purposes of executing Additional Program I. Similarly, the transmission of the program from programmer 54 via line 52 can also be effected either in relation to time or in the previously described manner by means of impulses or other signals, which are fed via lines 63 and 66. The same applies to Additional Program II as well, the start of which by means of the photocell 78 is effected via a line 82 as eoon as the free end of the preform 42 influences the photocell 78 during the extrusion process.

A significant advantage of the invention will be explained in the following with reference to FIG. 2b. When an extrusion—blow machine is adjusted, it is frequently necessary to reset the programmer 53 for the Base Program several times in order to achieve the desired wall thickness distribution, and this must be done before the correct wall thickness distribution is achieved over the entire length of the preform. For instance, if it is realized in the case of a programmer provided with e.g. twenty-five switch points, that it is necessary to undertake changes at, for instance, two switch points which are activated shortly before the completion of the extrusion of the preform, this change, which causes merely an increase or decrease of the x values, has the effect that there is a change in position in one or the other direction along the longitudinal axis of the preform of all others extending thereunder, previously activated during the extrusion process and corresponding to points on the preform. In any case, this cannot be avoided if the control of the wall thickness program relies on volume and time, since a change of x values and consequently of the slot width of the exit opening 21 also always results in a change in the rate of exit speed of the preform, so that that tubular section coming out of the extrusion head per time unit or per volume unit will be longer or shorter than before this change. This means that a change in respect to switch points within certain cases also make it necessary to change all other switch points which are time-wise located prior to a changed switch point during the extrusion process, this in order to compensate for the changes in the positions of local wall thicknesses along the longitudinal axis of the preform which will by necessity occur due to a later change of the setting of one switch point in an already established program. This may be a very time-consuming and laborious task which, in addition, can be preformed only by an expert.

If the theory according to the invention is applied, these difficulties are eliminated, or at least decreased to such a degree that they no longer are of practical importance.

In FIG. 2b, Additional Program I is represented below the y bar as a diagonally hatched bar designated Ic. This should indicate a corrected location of Additional Program I which is represented in a solid form above the y bar. This means that a later correction of Additional Program I from the solid form to the hatched form position moved the Additional Program I to the right by approximately half the distance between two adjacent switch points 184 of the Base Program. For this purpose, all that is required is a change of the starting point of y'.

The signal sequences fed into the programming devices may be digital signals, such as, e.g., the previously mentioned impulses, but they may also be developed as analog signals, for instance voltage differences.

As already mentioned, time, travel distance of the piston emptying the storage space, the length of the preform proper, or other parameters derived from these, may be used as dimensions for the previously mentioned impulses or other units for the production of a preform.

Finally, it should also be mentioned that a shortening or lengthening of the expulsion stroke of the piston 19 will normally lead to a shortening or lengthening of the preform 42. However, this must not necessarily be the case, since with a lesser width of the exit slot 21, the material ejected from the storage space will be distributed over a greater length of the preform. Conversely, with a greater width of the exit slot 21, the material ejected from the storage space is distributed over a shorter length of the preform.

Although the invention is described in the preceding in conjunction with wall thickness control effective over the length of the preform, it is also applicable without difficulty to wall thickness control resulting in different wall thickness of the preform over its circumference. Naturally, it is also possible to imagine applications of the invention, whereby a wall thickness control according to the invention, effective over the length of the preform, is combined with a wall thickness control leading to different wall thicknesses of the preform over its circumference. Simultaneous application of both control methods is also possible when in both cases a section of the preform is controlled by at least one additional program, which is effective in the same direction as the related base program, i.e. either axially or circumferentially.

In the execution examples represented in the drawing, the value $x'$ of the additional programming device 54 always has a positive sign, so that $x'$ always leads to an increase $(x+(+x')=x+x')$ of the wall thickness. However, it is obviously also possible that the value $x'$ is negative and thus leads to a decrease $(x+(-x')=x-x')$ of the wall thickness which is determined by the value x of the first programming device 53.

The preceding description of the invention in conjunction with an extrusion—blow device, the extruder head of which has a storage space causing the preform to be discontinuously extruded from the slot-shaped exit opening, does not represent a limitation of the invention to this execution form. Rather, the invention is also applicable to such extrusion—blow devices, where the preform is continuously extruded through the exit opening of the extruder head. In this case, the length of the preform or other appropriate parameters can be used as dimensions for the impulses or other signal sequences.

It is a significant advantage of the invention that it can be applied without difficulties to already existing machines and, furthermore, also in combination with other regulation and control devices, such as, for instance, those described in German Auslegeschrift No. 2,540,609 and German Offenlegungsschrift No. 2,940,418.

We claim:

1. Procedure for manufacturing a preform of thermoplastic synthetic material by means of extrusion from an extruding head provided with a slot-shaped exit opening, the width of which is changed during the extrusion of the preform in order to adjust the wall thickness of the same according to a predetermined program, characterized thereby that the wall thickness of at least one partial area of the preform is controlled by means of at least one additional program, which is superposed upon the first program, which is longer than the additional program.

2. Procedure according to claim 1, characterized thereby that the additional program is used twice or more times during the extrusion of said preform.

3. Procedure according to claim 1 or 2, characterized thereby that the length (y') of the additional program and/or the values (x') of the slot width are changed for repeated uses of the additional program for the same preform.

4. Procedure according to claim 2, characterized thereby that the additional program, when used repeatedly, is applied, with respect to the length (y'), as a mirror image of the first use on the preform.

5. Device for manufacturing of a preform of thermoplastic synthetic material by means of extrusion from an extruder head provided with a slot-shaped exit opening, the width of which is adjustable during the extrusion of the preform in order to adjust the wall thickness thereof by means of a device provided with a specific program for the distribution of the wall thickness of the preform, characterized thereby that at least one second device (54) provided with a program for influencing the wall thickness of the preform (42) has been included in the design and that this program is shorter in respect to its duration in time or the extent of its influence on the preform (42) than the program of the first programmed device (53) and is in effect only in at least one partial area of the program of the first device (62).

6. Device according to claim 5, characterized thereby that the distance on the preform (42) corresponding to the distance between two adjacent switch points on the second programmed device (54) which release a change of the slot width, is shorter than in the first programmed device (53).

7. Device according to claim 5 or 6, characterized thereby that the number of switch points (84) on the second programmed device is identical to the number of switch points of the first programmed device (53).

8. Device according to claim 5 or 6, characterized thereby that the number of switch points (84) of the second programmed device (54) is greater than the number of switch points (84) of the first programmed device.

9. Device according to claim 5 or 6, characterized thereby that the total number of the switch points of the second programmed device (54) is lesser than the total number of switch points (84) of the first programmed device (53).

10. Device according to claim 5, characterized thereby that the switch points (84) of the first programmed device (53) are arranged at constant distances from one another.

11. Device according to claim 5, characterized thereby that the switch points (84) of the second programmed device (54) are arranged at constant distances from one another.

12. Device according to claim 5, characterized thereby that the second programmed device (54) is controlled by dependence on the same characteristic quantities as those of the first programmed device.

13. Device according to claim 5, characterized thereby that the first programmed device (53) and the second programmed device (54) are controlled by dependence on different characteristic quantities.

14. Device according to claim 5, characterized thereby that at least one of the two programmed devices (53, 54) is controlled in dependence of time.

15. Device according to claim 5, characterized thereby that, when an extrusion head (14) is used which is provided with a storage chamber (18) that can be emptied by means of a piston (19), at least one of the two programmed devices (53, 54) is controlled by dependence on the piston travel during the piston stroke for extrusion.

16. Device according to claim 5, characterized thereby that at least one of the two programmed devices (53, 54) is controlled by dependence on the actual length of the preform during the extrusion process.

17. Device according to claim 5, characterized thereby that the second programmed device (54) is provided with two or more modification members (72, 74, 71; 73) for adjusting the length (y') of the program to the length of that section of the preform which is to be influenced by the program on any given occasion, and for adjusting the values (x') related to the width of the exit slot (21) to the desired absolute width of the exit slot (21) on any given occasion, and that the modification members (71, 72; 73, 74) are alternatingly connected with the programmed device (54).

18. Device according to claim 6, characterized thereby that the switch points (84) of the first programmed device (53) are arranged at constant distances from one another.

19. Device according to claim 6, characterized thereby that the switch points (84) of the second programmed device (54) are arranged at constant distances from one another.

20. Device according to claim 6, characterized thereby that the second programmed device (54) is controlled by dependence on the same characteristic quantities as those of the first programmed device.

21. Device according to claim 6, characterized thereby that the first programmed device (53) and the second programmed device (54) are controlled by dependence on different characteristic quantities.

22. Device according to claim 6, characterized thereby that at least one of the two programmed devices (53, 54) is controlled in dependence of time.

23. Device according to claim 6, characterized thereby that, when an extrusion head (14) is used which is provided with a storage chamber (18) that can be emptied by means of a piston (19), at least one of the two programmed devices (53, 54) is controlled by dependence on the piston travel during the piston stroke for extrusion.

24. Device according to claim 6, characterized thereby that at least one of the two programmed devices (53, 54) is controlled by dependence on the actual length of the preform during the extrusion process.

25. Device according to claim 6, characterized thereby that the second programmed device (54) is provided with two or more modification members (72, 74; 71, 73) for adjusting the length (y') of the program to the length of that section of the preform which is to be influenced by the program on any given occasion, and for adjusting the values (x') related to the width of the exit slot (21) to the desired absolute width of the exit slot (21) on any given occasion, and that the modification members (71, 72; 73, 74) are alternatingly connected with the programmed device (54).

* * * * *